Jan. 18, 1938.  G. GRIFFIN  2,105,915
MANUFACTURE OF ATTRITION DEVICES
Filed Dec. 30, 1935   2 Sheets-Sheet 1
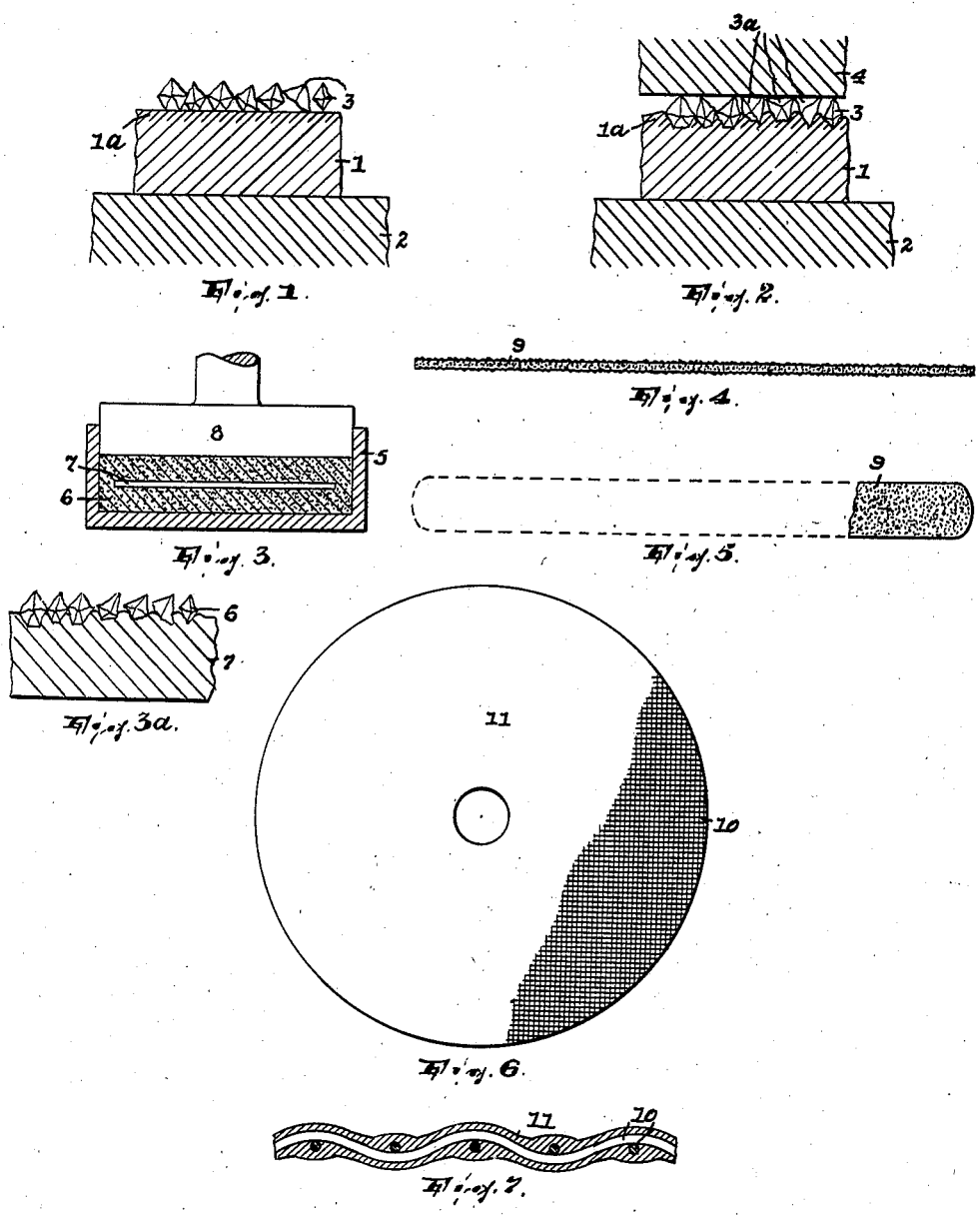
INVENTOR,
George Griffin,
BY John Steward.
ATTORNEY.

Jan. 18, 1938.  G. GRIFFIN  2,105,915
MANUFACTURE OF ATTRITION DEVICES
Filed Dec. 30, 1935  2 Sheets-Sheet 2
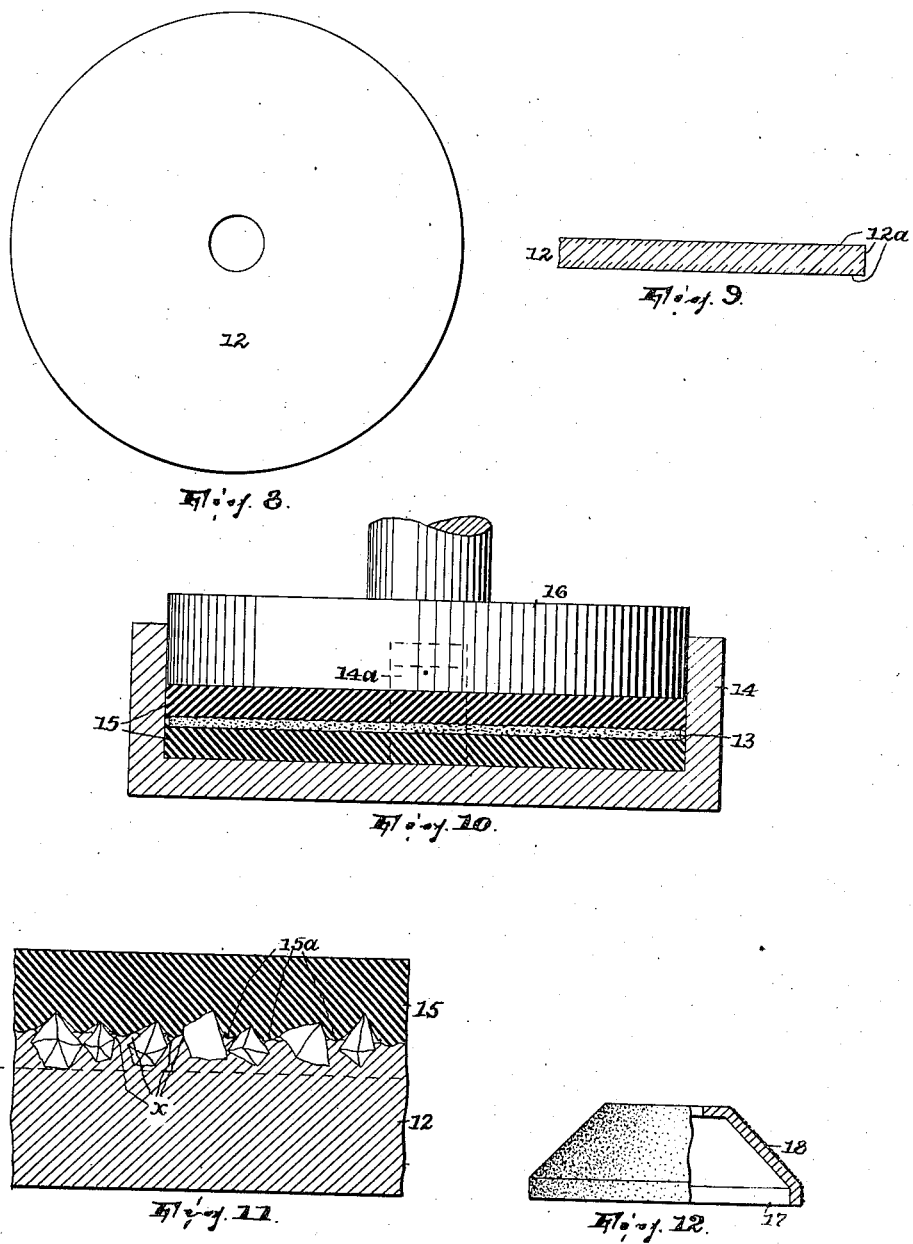
INVENTOR.
George Griffin,
BY
John Steward
ATTORNEY.

Patented Jan. 18, 1938

2,105,915

UNITED STATES PATENT OFFICE 2,105,915

MANUFACTURE OF ATTRITION DEVICES

George Griffin, Paterson, N. J., assignor, by mesne assignments, of three-fourths to Miller P. Griffin and one-fourth to John W. Steward Application December 30, 1935, Serial No. 56,731

6 Claims. (Cl. 51—185)

According to this invention I have produced an attrition appliance, useful for divers purposes such as for cleaning the ignition points of electrical equipment or smoothing or abrading metal and other surfaces, or as manicure and the like files, which, comprising a backing of a plastic substance and grits of attrition particles adhering thereto, may be quite flexible and in any event is not likely to chip or fracture under severe treatment when in use and which will resist the separation of such grits or particles from the backing until the former have by wear thereof practically ceased to have effective attrition action and the appliance is for that reason no longer serviceable.

In the drawings,

Fig. 1 is a fragmentary view showing a bed or anvil, a plastic backing thereon having its upper surface portion softened, and the grits resting on such backing, the bed or anvil and such backing appearing in section;

Fig. 2 is a view showing the elements of Fig. 1 again in section but including a plunger, also in section, at or during its pressure stroke;

Fig. 3 shows a mold, a mass of the grits therein in which is buried a plastic backing, and a plunger coacting with the mold to compress its contents, the latter and said mass appearing in section;

Fig. 3a shows in fragmentary and enlarged section the product of the treatment illustrated by Fig. 3;

Figs. 4 and 5 are, respectively, a side elevation and a plan of such product;

Fig. 6 shows a meshed fabric, as wire-mesh, partially coated with plastic substance;

Fig. 7 is an enlarged fragmentary sectional view through the coated portion of the fabric shown in Fig. 6;

Fig. 8 shows in plan one of the disks of plastic substance to be used with the disk of Figs. 6 and 7;

Fig. 9 is an enlarged fragmentary sectional view of the disk of Fig. 8 with its marginal surface softened;

Fig. 10 shows a unit (comprising a disk like that of Fig. 6 sandwiched between and adhering to two disks like that of Fig. 8) coated with attrition grits; such unit being contained in a mold having a plunger and two elastic pads between which the unit is arranged, the mold and the pads appearing in section and the unit and plunger in elevation;

Fig. 11 is a fragmentary sectional view of an elastic pad and a body such as one of the disks of Fig. 8 having the grits impressed therein by the pad, the condition being that when the pressure is active; and Fig. 12 shows an attrition body produced in accordance with the invention but having a conical form, the same appearing in section, partly broken away.

For the backing I use a tough cellulose product, usually in flexible sheet-like form, such as cellulose acetate, and for the grits particles of carborundum or other particles suitable for effective abrading or attrition action.

In Figs. 1 and 2 I designates a backing of cellulose acetate which has had a suitable solvent (as what is known as I. P. Cement) applied to one face thereof so that for a suitable depth from such face the substance of the backing is softened, as at 1a. 2 is a metal anvil or bed on which the backing is placed and 3 denotes attrition (as carborundum) grits or particles which have been scattered over and form a layer on the softened portion of the backing. 4 is a plunger presenting a smooth and hard face to the grits, being of metal. When movement, one toward the other, as between the anvil and plunger is effected so as to compress the backing and grits while the portion 1a is still soft and hence adapted to yield to each particle or grit the grits will be impressed into and thus embedded in said portion and upon the hardening or setting of said portion while the grits remain so embedded, as by maintaining the compression, the grits will be adhesively held by and so united to the backing. One of the pressure elements (here the plunger) presents a smooth, hard surface to the grits wherefore many of the grits, as 3a, have been forced by said surface to tilt from their original positions so as to present facets rather than corners or edges thereof outward or away from the backing and their tops are all approximately at the same level.

Or the procedure may be according to Figs. 3 and 3a in which whatever tilting occurs of the grits which go to form the attrition surface of the appliance and as they are pressed into the pre-softened surface of the sheet is merely as casual and not as general or so extensive as before described because of the absence of a smooth, hard surface directly presented to them. Incidentally the backing may here have the grits applied to the whole exterior thereof. Here the bottom of a metal mold 5 affords the anvil and in the mold is placed a quantity of grits 6 upon which a sheet 7 of cellulose acetate treated with the solvent (as by dipping it therein) is placed and then covered with more grits so that the backing formed by the sheet is buried in the mass or agglomeration of grits, the term "agglomeration" being herein used to mean a mass of grits comprising, with the layer of grits actually in contact with the softened surface portion, other grits superimposed on and completely covering such layer. 8 is a plunger which approximately fits the mold. Before the softened exterior of the backing has been allowed to set movement, one toward the other, as between the plunger and mold is effected so as to compress its contents and thus impress the grits into and hence embed them in the softened portion of the backing. When such portion has set the product 9 (Figs. 4 and 5) may be removed from the mold and cleared of all loose grits, i. e., those not actually embedded and so adhering to the backing.

The product of Figs. 1 and 2 is adapted for finer attrition action (for instance, as a manicure file or abrasive) than that (Figs. 4 and 5) of Figs. 3 and 3a.

Or I may proceed in accordance with Figs. 6 to 10 where 10 designates a meshed fabric, here of wire and in the form of a disk. This is coated in any way, as by dipping, with cellulose acetate in solution, the coating 11 preferably immuring the disk (Fig. 7) and filling its apertures. Then each of two cellulose acetate disks 12 of the same diameter as disk 10 is dipped in or otherwise treated with the solvent to soften at least one face thereof (but here—Fig. 9—its whole surface 12a) and these two disks are placed with their said faces, still soft, in contact and register with the disk 10—11 (or so that the latter is sandwiched between them) and so cemented thereto. The composite element thus formed is then dipped in the solvent and, grits having been placed in any suitable receptacle and levelled off, such element is laid on the grits and, more grits being placed on said element, the contents of the receptacle are well packed down, as by hand, to insure the adhesion to the soft surface of said element of all such grits as are in actual contact therewith. Having removed the unit thus resulting from the mass of grits (or said element having grits adhering thereto at both main faces as well as at its periphery) and cleared away all freely removable grits said unit, 13, is placed in a mold 14 (having a stem 14a upstanding from its base or anvil and which will serve to center the unit) between two elastic (as rubber) pads 15 and, while said surface is still soft, movement, one toward the other, of the mold and a plunger 16 is effected to exert pressure on said unit. When said surface has set the completed unit is removed from the mold and pads.

In Fig. 11 I have shown one of the disks 12, the corresponding pad and the grits when the pressure has proceeded so far that portions 15a of said pad have come into actual contact with and pressed the portion 12a of the disk which, previously softened as stated, is here assumed to have now set. The dotted line a indicates the approximate depth to which the disk was softened, to wit, a depth sufficient to permit the grits of the largest size to be impressed in the disk and still remain exposed to some predetermined degree above the surface of the disk. During the movement to exert the pressure the pad first encountered the grits and then caused them to become impressed into the soft layer existing between line a and the surface of the disk, but as the pressure continued its said portions 15a followed through, as it were, yielding only locally or where each grit exists, and came into contact with said surface wherever the same happened to be exposed by the grits. Said layer being still more or less soft the pad portions 15a impressed it between the grits, exerting more force thereon at the point midway between each two grits than it did immediately surrounding each grit so that portions of said layer so immediately surrounding each grit were displaced to produce fillets $x$ laterally pressed against and closely hugging and wherever possible actually overhanging the grits, such fillets being elevated above the normal (i. e., initial) surface-level of said layer. Hence, upon the setting these thus elevated fillets remain to bond the grits firmly to the backing formed by disk 12.

While elasticity in the pad is desirable to the end that, however, it may be distorted upon each pressure application, it will re-assume its original shape when released from the pressure, fundamentally it is important only that the pad be of material capable of yielding to localized resistance.

The appliance, however produced, may take any form. For instance, in Fig. 12, 17 is a plastic backing of truncated conical form having the grits 18 embedded therein and adhering thereto as described.

In any form the central hole of the appliance is adapted to receive a rotary spindle or equivalent on which it is affixed when in use.

It is known to coat a cellulosic sheet or other backing with a cement and then, having applied to such cement attrition particles, to subject the whole to heat and pressure, thus leaving the particles perhaps embedded in the backing but only united therewith through the intermediary of the cement. I produce a stronger bond between the particles and the backing and also simplify the procedure by effecting their union by softening the surface portion of the backing and pressing and thus embedding the particles therein while it still remains in softened state and preferably maintaining them so embedded until the softened portion of the backing has set or hardened.

So far as I am aware an attrition appliance including a backing of a tough plastic substance and grits protruding therefrom and embedded therein to a depth less than the thickness of the backing is new, thus distinguishing from an attrition appliance in which the plastic substance was a mere coating (as glue) on a backing and through which each grit extended.

The depth of penetration of the solvent may vary as desired depending on the quantity of solvent applied or the length of time in which the backing remains dipped therein, and usually will not be such that the grits will be flush with the surface of the backing when they have been embedded and it has set or hardened. In the use of the term "surface portion" I of course mean that the solvent attains some degree of depth, however microscopic; such degree of depth should of course vary according to the size of the grits.

Besides having the advantage that the attrition surface of the appliance will be as completely as possible composed of the grits an advantage of opposing the softened surface portion of the backing with an agglomeration of the grits (as in Fig. 3) instead of with a mere single stratum (as in Fig. 2 or Fig. 10) is that in any case, since the body of grits above the stratum actually being more or less embedded is more or less fluid, every grit in such stratum being so embedded is likely to undergo the pressure and so become effectually embedded.

Having thus fully described my invention what I claim is:

1. The method of forming an attrition appliance which consists in softening a surface portion of a normally tough plastic substance, bringing into direct contact with each other said surface portion and a layer of grits, and pressing the grits and substance together while said surface portion still remains in softened state and maintaining the pressure until said surface portion sets.

2. The method of forming an attrition appliance which consists in softening a surface portion of a normally tough plastic substance, bringing into direct contact with each other said surface portion and an agglomeration of grits, and pressing said agglomeration and substances together while said surface portion still remains in softened state and maintaining the pressure until said surface portion sets.

3. The method of forming an attrition appliance which consists in pressing grits, distributed over and in contact with a temporarily softened surface portion of a tough plastic substance, into said surface portion through the intermediary of a medium positioned next to the grits and which will yield locally to the grits and while said surface portion still remains in softened state.

4. The method of forming an attrition appliance which consists in pressing grits, distributed over and in contact with a temporarily softened surface portion of a tough plastic substance, into said surface portion through the intermediary of an elastic medium positioned next to the grits and which will yield locally to the grits and while said surface portion still remains in softened state.

5. The method of forming an attrition appliance which consists in pressing grits, distributed over and in contact with a temporarily softened surface portion of a tough plastic substance, into said surface portion through the intermediary of a medium positioned next to the grits and which will yield locally to the grits and while said surface portion still remains in softened state and continuing the pressure until portions of said medium exert pressure on said surface portion wherever the same is exposed by the grits.

6. The method of forming an attrition appliance which consists in distributing a layer of grits in contact with one temporarily softened face of a tough plastic layer, placing next to the thus distributed grits a layer which will yield locally to the grits, and then exerting pressure on the second and third named elements toward each other which is uniform throughout the area thereof opposed by the entire layer of grits.

GEORGE GRIFFIN.